(12) United States Patent
Xie

(10) Patent No.: US 9,784,996 B2
(45) Date of Patent: Oct. 10, 2017

(54) LIQUID CRYSTAL DISPLAY MODULE AND DEVICE

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 191 days.

(21) Appl. No.: 14/655,415

(22) PCT Filed: Jun. 5, 2015

(86) PCT No.: PCT/CN2015/080880
§ 371 (c)(1),
(2) Date: Jun. 25, 2015

(87) PCT Pub. No.: WO2016/183884
PCT Pub. Date: Nov. 24, 2016

(65) Prior Publication Data
US 2017/0139242 A1    May 18, 2017

(30) Foreign Application Priority Data

May 21, 2015  (CN) .......................... 2015 1 0262687

(51) Int. Cl.
*G02F 1/13*       (2006.01)
*G02F 1/1343*     (2006.01)
(Continued)

(52) U.S. Cl.
CPC ............ *G02F 1/1323* (2013.01); *G02F 1/137* (2013.01); *G02F 1/134363* (2013.01);
(Continued)

(58) Field of Classification Search
CPC ........ G02F 1/13; G02F 1/1313; G02F 1/1323; G02F 1/1335; G02F 1/1343;
(Continued)

(56) References Cited

U.S. PATENT DOCUMENTS

2007/0085957 A1    4/2007  Jin et al.
2010/0103148 A1*   4/2010  Okazaki ................ G02F 1/1323
                                                        345/204
(Continued)

FOREIGN PATENT DOCUMENTS

CN    102081268 A    6/2011
CN    102566147 A    7/2012
(Continued)

*Primary Examiner* — Thoi Duong
(74) *Attorney, Agent, or Firm* — Andrew C. Cheng

(57) ABSTRACT

The present invention provides a liquid crystal display (LCD) module and device with switchable viewing angles. The LCD module and device contain parallel and sequentially stacked backlight unit, LCD unit, and view-angle adjustment unit. The backlight unit is positioned along a back side of the LCD module and device as a backlight light source. The LCD unit is sandwiched between the backlight unit and the view-angle adjustment unit. Light produced by the backlight unit propagates through the LCD unit and the view-angle adjustment unit sequentially. Through the view-angle adjustment unit, The LCD module and device can switch between a wide angle mode and a narrow angle mode.

16 Claims, 2 Drawing Sheets

(51) Int. Cl.
*G02F 1/137* (2006.01)
*G02F 1/1333* (2006.01)

(52) U.S. Cl.
CPC ............ *G02F 2001/13706* (2013.01); *G02F 2001/133302* (2013.01); *G02F 2202/28* (2013.01)

(58) Field of Classification Search
CPC .......... G02F 1/134309; G02F 1/13439; G02F 1/137; G02F 1/134363; G02F 1/13306; G02F 1/133504; G02F 1/133524; G02F 1/133615; G02F 1/133602; G02F 1/1347; G02F 1/133; G02F 1/141; G02F 2001/133562; G02F 2001/13706
USPC .......... 348/51, 837; 349/33, 65, 36, 37, 139, 349/202; 359/259, 55, 84, 87
See application file for complete search history.

(56) References Cited

U.S. PATENT DOCUMENTS

| | | |
|---|---|---|
| 2012/0113362 A1 | 5/2012 | Lim et al. |
| 2016/0026014 A1 | 1/2016 | Zhao |

FOREIGN PATENT DOCUMENTS

| | | |
|---|---|---|
| JP | 2007264425 A | 4/2009 |
| KR | 20080049459 A | 12/2009 |

\* cited by examiner

LIQUID CRYSTAL DISPLAY MODULE AND DEVICE

BACKGROUND OF THE INVENTION

1. Field of the Invention

The present invention generally relates to liquid crystal display (LCD) technology, and particularly relates to a LCD module and device with adjustable viewing angle.

2. The Related Arts

As liquid crystal display (LCD) becomes widely popular on mobile devices, people demand better quality and more human-oriented design from the LCD. Sometimes people want to share what is shown on the display with others. There are also times when people do not wish others to see. Therefore, a display capable of switching between wide and narrow viewing angles is desired.

SUMMARY OF THE INVENTION

The technical issue to be addressed by the present invention is to provide a LCD module and device with adjustable viewing angle so as to resolve the shortcoming of the prior art where the LCD module and device cannot provide switchable narrow and wide viewing angles.

To address the technical issue, the present invention provides a LCD module containing parallel and sequentially stacked backlight unit, LCD unit, and view-angle adjustment unit. The backlight unit is positioned along a back side of the LCD module as a backlight light source. The LCD unit is sandwiched between the backlight unit and the view-angle adjustment unit. Light produced by the backlight unit propagates through the LCD unit and the view-angle adjustment unit sequentially.

In an embodiment, the view-angle adjustment unit contains a front glass substrate, a back glass substrate, a number of electrodes, and a number of liquid crystal molecules; and the electrodes and the liquid crystal molecules are sandwiched between the front and back glass substrates.

In an embodiment, the electrodes are positioned at intervals between the front and back glass substrates, forming a number of chambers between neighboring electrodes, and the liquid crystal molecules are positioned in the chambers.

In an embodiment, voltages of reversed polarities are applied to neighboring electrodes, thereby forming a lateral electrical field between neighboring electrodes. By controlling whether to apply voltages of reversed polarities between neighboring electrodes, the LCD module is capable of switching between a wide angle mode and a narrow angle mode.

In an embodiment, each electrode has a column shape.

In an embodiment, the liquid crystal modules are positive liquid crystal molecules; and the liquid crystal molecules are vertically aligned initially.

In an embodiment, each electrode comprise a body and a conductive layer configured on the body.

In an embodiment, the body is made of resin, and the conductive layer is formed on the body by sputtering.

In an embodiment, the chambers are of equal volume.

To address the technical issue, the present invention also des a LCD device containing the above-described LCD module.

Compared to the prior art, the LCD module and device of the present invention provides a view-angle adjustment unit along the propagation path of light from a backlight unit. The view-angle adjustment unit has chambers filled with liquid crystal molecules and, by applying or removing electrical field to the liquid crystal molecules to alter their alignment between vertical alignment and lateral alignment, the light passing through the view-angle adjustment unit can travel without or with phase delay. The LCD module and device as such can switch between a wide angle mode and a narrow angle mode. In addition, compared to the prior art, the present invention has advantages such as simplified manufacturing, low cost, convenient operation, and enhanced effect of switching viewing angles.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
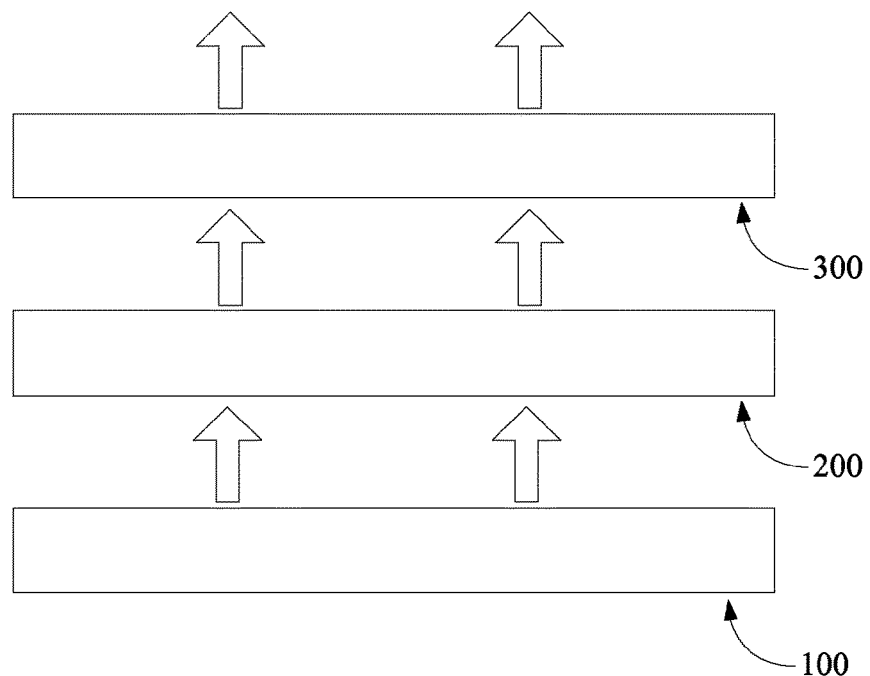
FIG. 1 is a schematic diagram showing a liquid crystal display (LCD) module according to an embodiment of the present invention.

FIG. 1 is a schematic diagram showing a liquid crystal display (LCD) module according to an embodiment of the present invention. As illustrated, the LCD module contains parallel and sequentially stacked backlight unit 100, LCD unit 200, and view-angle adjustment unit 300. The arrow heads indicate the propagation paths of light. The backlight unit 100 is positioned along a back side of the LCD module as a backlight light source. The LCD unit 200 is sandwiched between the backlight unit 100 and the view-angle adjustment unit 300. Light produced by the backlight unit 100 propagates through the LCD unit 200 and the view-angle adjustment unit 300 sequentially. The details about the backlight unit 100 and the LCD unit 200 should be familiar to people skilled in the related art and therefore are omitted here.

Figure 2:
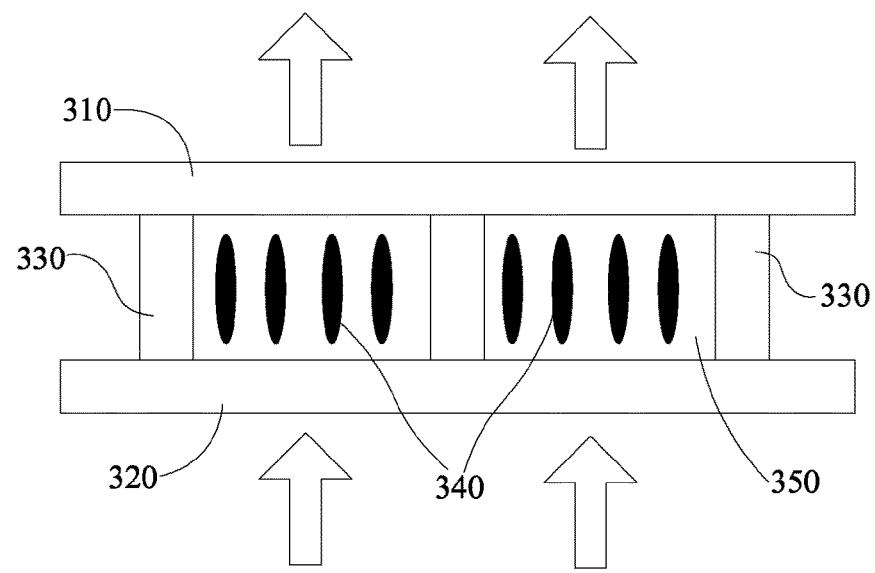
FIG. 2 is a schematic diagram showing the view-angle adjustment unit of FIG. 1 operating in a narrow angle mode.
Figure 3:
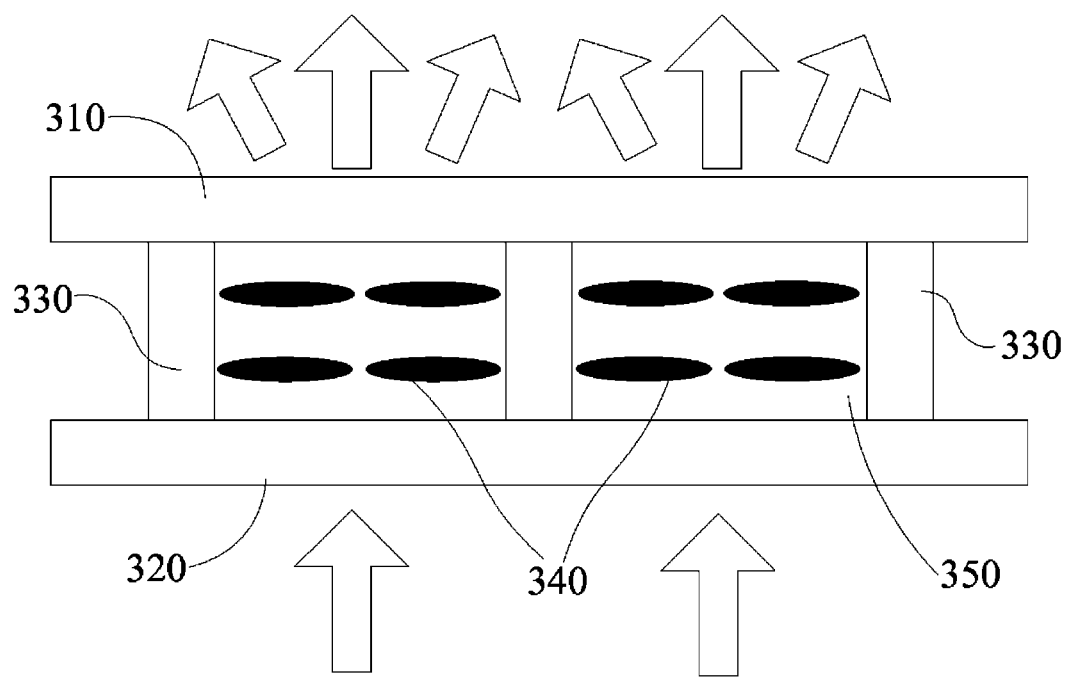
FIG. 3 is a schematic diagram showing the view-angle adjustment unit of FIG. 1 operating in a wide angle mode.

FIG. 2 is a schematic diagram showing the view-angle adjustment unit 300 of FIG. 1 operating in a narrow angle mode. FIG. 3 is a schematic diagram showing the view-angle adjustment unit 300 of FIG. 1 operating in a wide angle mode. The view-angle adjustment unit 300 contains a front glass substrate 310, a back glass substrate 320, and electrodes 330 and liquid crystal molecules 340 sandwiched between the front and back glass substrates 310 and 320.

Specifically, there are multiple electrodes 330 positioned at intervals between the front and back glass substrates 310 and 320. A chamber 350 is as such formed between neighboring electrodes 330. Preferably, the chambers 350 are of equal volume, and each chamber 350 accommodates multiple liquid crystal molecules 340. By applying voltages of reversed polarities on two neighboring electrodes 330, a lateral electrical field in-between is produced. Then, the LCD module can be operated in either the narrow angle mode or the wide angle mode in accordance with whether voltages are applied to the neighboring electrodes 330.

Preferably, each electrode 330 has a column shape. In alternative embodiments, the shape of each electrode 330 is not limited to the column shape, and can be, for example, a cuboid shape. This variation should be familiar to people skilled in the related art and further details are omitted. The liquid crystal molecules 340 are positive liquid crystals, and are vertically aligned in their initial state.

Each electrode 330 contains a body and a conductive layer configured on the body (both not shown). Specifically, the base is made of resin and the conductive layer is formed on the body by sputtering.

In the following, the narrow and wide angle modes of the LCD module are described.

Each chamber 350 between two neighboring electrodes 330 is filled with positive liquid crystal molecules 340. The liquid crystal molecules 340 are initially aligned vertically (i.e., perpendicular to the front and back glass substrates 310 and 320). In the narrow angle mode, the electrodes 330 are not applied voltages and the liquid crystal molecules 340 remain vertically aligned as shown in FIG. 2. As the light incident from the backlight unit 100 propagates towards the view-angle adjustment unit 300, the vertically aligned liquid crystal molecules 340 do not introduce phase delay into the passing light. The light therefore travels along its original direction and the light is not scattered.

In the wide angle mode, voltages of reversed polarities are applied to neighboring electrodes 330 and lateral electrical fields are produced in the chambers 350. Under the influence of the lateral electrical fields, the positive liquid crystal molecules 340 are aligned laterally as shown in FIG. 3. As the light incident from the backlight unit 100 propagates towards the view-angle adjustment unit 300, the laterally aligned liquid crystal molecules 340 introduce phase delay into the passing light. The direction of the light therefore is altered and the light is scattered, achieving a wide viewing angle. In FIGS. 2 and 3, the arrow heads indicate the propagation of light.

The present invention also provides a LCD device incorporating the above described LCD module. The other details of the LCD device should be familiar to people skilled in the related art and are omitted here.

Compared to the prior art, the LCD module and device of the present invention provides a view-angle adjustment unit along the propagation path of light from a backlight unit. The view-angle adjustment unit has chambers filled with liquid crystal molecules and, by applying or removing electrical field to the liquid crystal molecules to alter their alignment between vertical alignment and lateral alignment, the light passing through the view-angle adjustment unit can travel without or with phase delay. The LCD module and device as such can switch between a wide angle mode and a narrow angle mode. In addition, compared to the prior art, the present invention has advantages such as simplified manufacturing, low cost, convenient operation, and enhanced effect of switching viewing angles.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A liquid crystal display (LCD) module, comprising parallel and sequentially stacked backlight unit, LCD unit, and view-angle adjustment unit, wherein the backlight unit is positioned along a back side of the LCD module as a backlight light source; the LCD unit is sandwiched between the backlight unit and the view-angle adjustment unit; light produced by the backlight unit propagates through the LCD unit and the view-angle adjustment unit sequentially; the view-angle adjustment unit comprises a front glass substrate, a back glass substrate, a plurality of electrodes, and a plurality of liquid crystal molecules; the electrodes and the liquid crystal molecules are sandwiched between the front and back glass substrates; the electrodes are positioned at intervals between the front and back glass substrates, forming a plurality of chambers between neighboring electrodes; the liquid crystal molecules are positioned in the chambers; the liquid crystal molecules are positive liquid crystal molecules; and the liquid crystal molecules are vertically aligned initially.

2. A liquid crystal display (LCD) module, comprising parallel and sequentially stacked backlight unit, LCD unit, and view-angle adjustment unit, wherein the backlight unit is positioned along a back side of the LCD module as a backlight light source; the LCD unit is sandwiched between the backlight unit and the view-angle adjustment unit; and light produced by the backlight unit propagates through the LCD unit and the view-angle adjustment unit sequentially; the view-angle adjustment unit comprises a front glass substrate, a back glass substrate, a plurality of electrodes, and a plurality of liquid crystal molecules; and the electrodes and the liquid crystal molecules are sandwiched between the front and back glass substrates; the electrodes are positioned at intervals between the front and back glass substrates, forming a plurality of chambers between neighboring electrodes; and the liquid crystal molecules are positioned in the chambers.

3. The LCD module as claimed in claim 2, wherein voltages of reversed polarities are applied to neighboring electrodes, thereby forming a lateral electrical field between neighboring electrodes; and, by controlling whether to apply voltages of reversed polarities between neighboring electrodes, the LCD module is capable of switching between a wide angle mode and a narrow angle mode.

4. The LCD module as claimed in claim 2, wherein each electrode has a column shape.

5. The LCD module as claimed in claim 2, wherein each electrode comprise a body and a conductive layer configured on the body.

6. The LCD module as claimed in claim 5, wherein the body is made of resin.

7. The LCD module as claimed in claim 6, wherein the conductive layer is formed on the body by sputtering.

8. The LCD module as claimed in claim 2, wherein the chambers are of equal volume.

9. The LCD module as claimed in claim 2, wherein the liquid crystal molecules are positive liquid crystal molecules; and the liquid crystal molecules are vertically aligned initially.

10. A liquid crystal display (LCD) device, comprising a LCD module, wherein the LCD module comprises parallel and sequentially stacked backlight unit, LCD unit, and view-angle adjustment unit, the backlight unit is positioned along a back side of the LCD module as a backlight light source; the LCD unit is sandwiched between the backlight unit and the view-angle adjustment unit; and light produced by the backlight unit propagates through the LCD unit and the view-angle adjustment unit sequentially; the view-angle adjustment unit comprises a front glass substrate, a back glass substrate, a plurality of electrodes, and a plurality of liquid crystal molecules; and the electrodes and the liquid crystal molecules are sandwiched between the front and back glass substrates; the electrodes are positioned at intervals between the front and back glass substrates, forming a plurality of chambers between neighboring electrodes; and the liquid crystal molecules are positioned in the chambers.

11. The LCD device as claimed in claim 10, wherein voltages of reversed polarities are applied to neighboring electrodes, thereby forming a lateral electrical field between neighboring electrodes; and, by controlling whether to apply voltages of reversed polarities between neighboring electrodes, the LCD module is capable of switching between a wide angle mode and a narrow angle mode.

12. The LCD device as claimed in claim 10, wherein each electrode has a column shape.

13. The LCD device as claimed in claim 10, wherein each electrode comprises a body and a conductive layer configured on the body.

14. The LCD device as claimed in claim 13, wherein the body is made of resin; and the conductive layer is formed on the body by sputtering.

15. The LCD device as claimed in claim 10, wherein the chambers are of equal volume.

16. The LCD device as claimed in claim 10, wherein the liquid crystal molecules are positive liquid crystal molecules; and the liquid crystal molecules are vertically aligned initially.

* * * * *